Patented Aug. 10, 1943

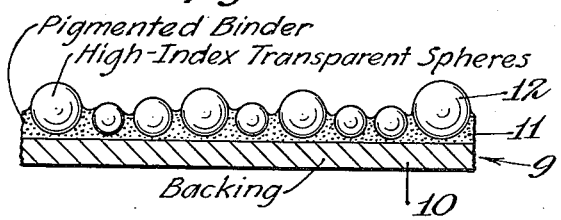
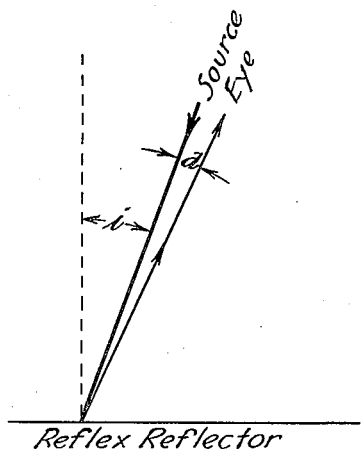
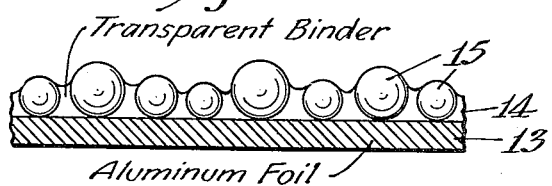
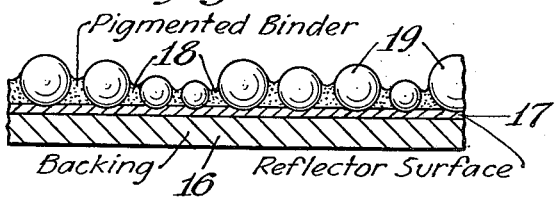
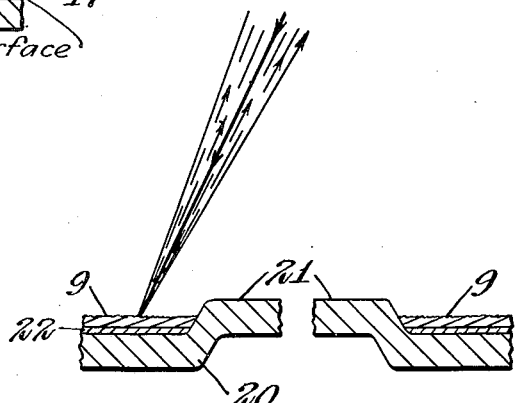
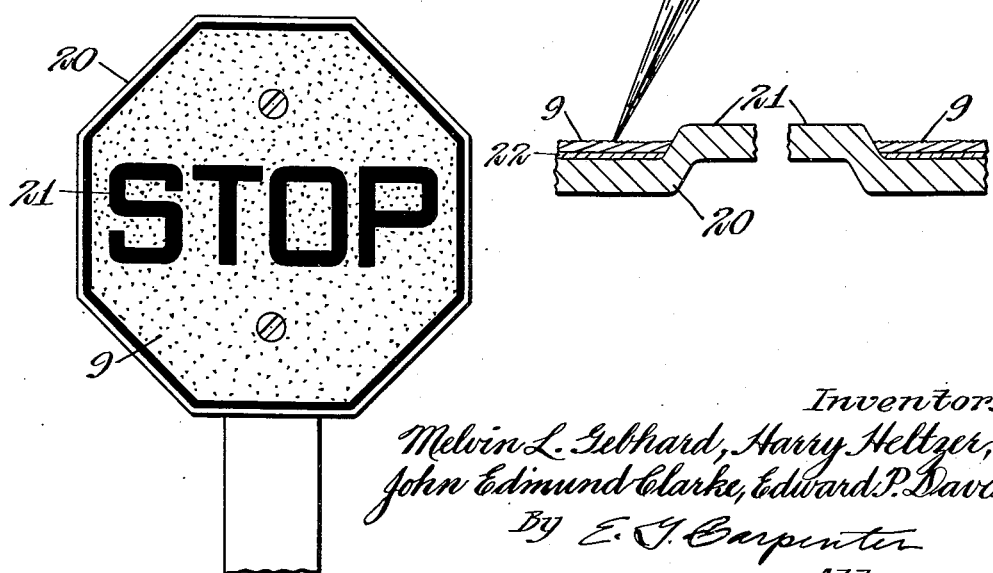

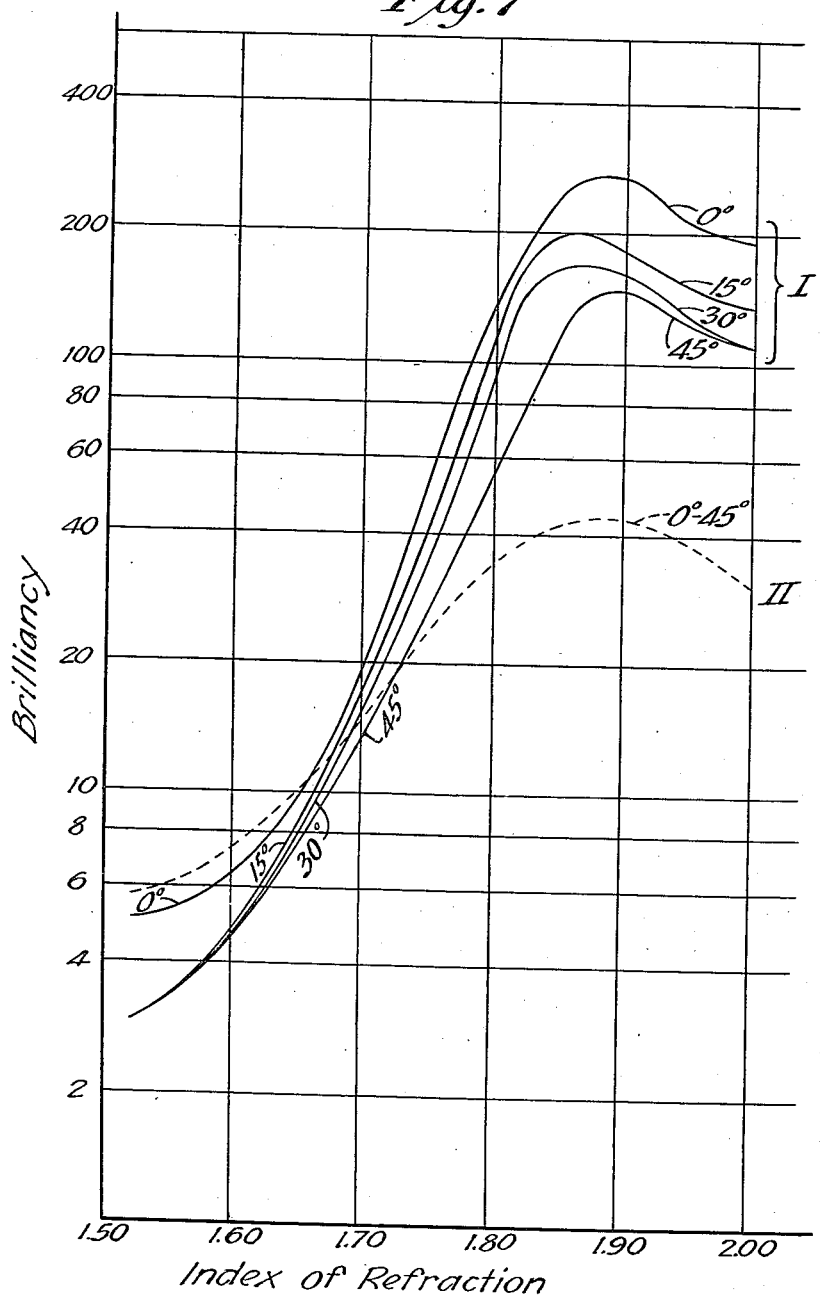

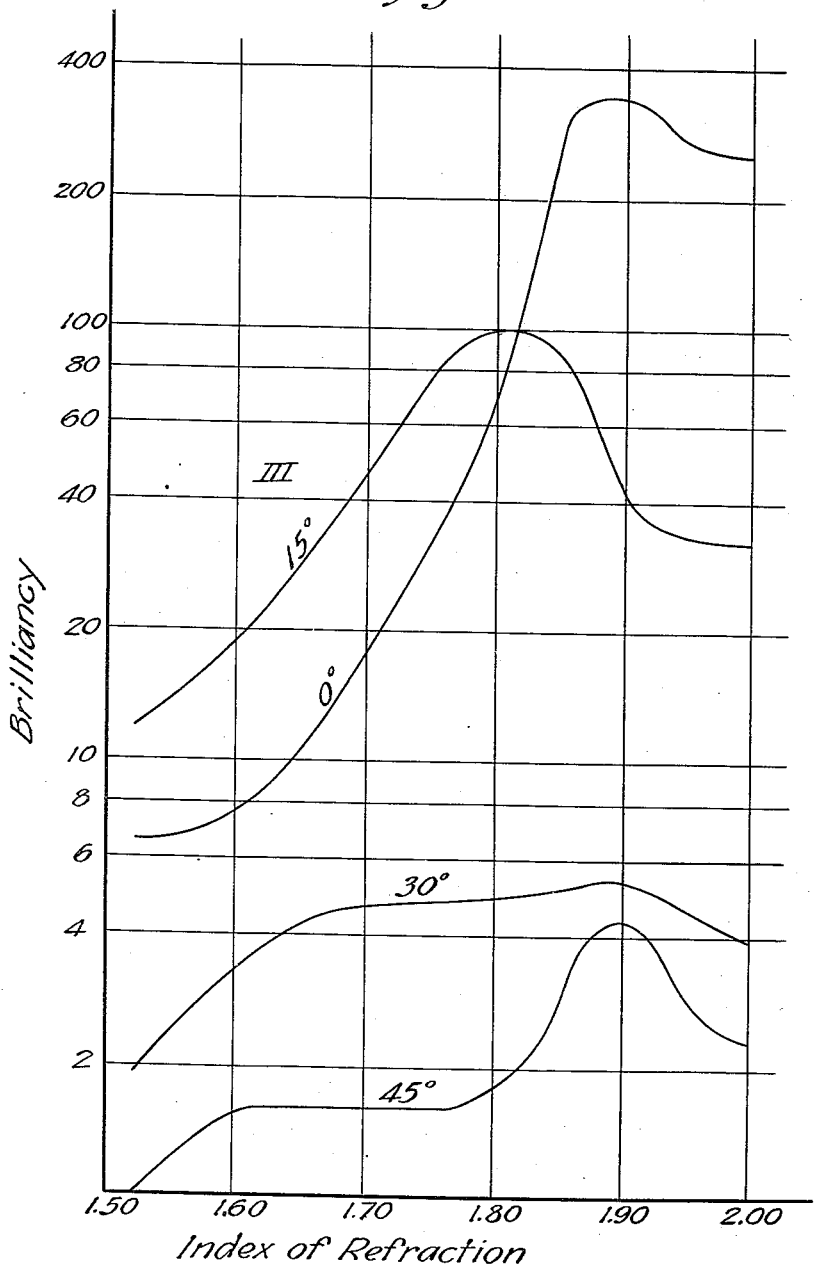

2,326,634

UNITED STATES PATENT OFFICE 2,326,634

REFLEX LIGHT REFLECTOR

Melvin L. Gebhard, Harry Heltzer, John Edmund Clarke, and Edward P. Davis, St. Paul, Minn., assignors to Minnesota Mining & Manufacturing Company, St. Paul, Minn., a corporation of Delaware Application December 26, 1941, Serial No. 424,528

13 Claims. (Cl. 88—82)

This invention relates to reflex light reflectors of the class in which a light-returning layer of contiguous small transparent beads or spheres is partially embedded in a bonding layer, with light-reflecting means being located behind the beads, so that an incident beam or ray of light is refracted and reflected in such manner that a brilliant cone of light is selectively returned toward the source, even though the incident light strikes at an angle (see Fig. 5). The characteristic of such a reflector in returning back a brilliant cone of light toward the source of an angularly incident ray, gives rise to the term "reflex" reflector, to distinguish from mirrors which cause specular reflection, and from diffusing surfaces which dissipate the incident light in all directions without selective return in the direction of incidence. Where light is reflexively reflected, an observer located near the axis of incident light will be able to see the reflected light at far greater distance than would be the case if diffuse reflection occurs. Road signs of the reflex type have greater visibility at night than ordinary signs.

The present invention is concerned with an improved type of this class of reflex reflectors, and aims to provide a reflex reflector of high brilliancy especially adapted to the making of highway signs, markers, and advertising displays, which will be visible at night at great distances to the occupants of approaching vehicles, but without undue sacrifice of other necessary characteristics.

We secure high brilliancy reflex reflection characteristics by employing transparent spheres of high refractive index. We have discovered that the refractive index range of approximately 1.70–1.90 is a critical range within which optimum brilliancy results and that the brilliancy which can be secured by using spheres of this refractive index is unexpectedly high. As will hereinafter be pointed out in some detail, there are various characteristics which should be present in a good reflex reflector, and we have discovered that there is such an advantageous combination of properties when the index of refraction is within the critical range that the high brilliancy is not secured at the sacrifice of other necessary or desirable properties. Thus the discovery is more than that of the relation of brilliancy to refractive index.

This critical range of approximately 1.70–1.90 lies far above the refractive index range of ordinary glass (about 1.50–1.55) and is higher than the refractive index of the common high-index optical glasses. The critical range lies below the value of 2.0 which might be thought to be the optimum from a calculation based upon elementary lens formulae. So far as we are aware, the prior art teaches nothing concerning the value of using spheres having a refractive index within the critical range which we have discovered, and it constitutes previously unexplored territory. The nature of the discovery will hereinafter be set forth in more detail in connection with a discussion of experimental data.

Although not limited thereto, an object is to provide flexible, weatherproof reflex reflector sheets adapted to be readily cut to desired shape and adhesively united to any desired base or backing. This permits the user to make his own signs without special equipment and, of particular importance, it permits the user to convert ordinary signs into the improved reflex type. The nature of the invention permits such sheet material to be conveniently manufactured in continuous web fashion and supplied in rolls of any reasonable width and length, thus reducing manufacturing costs and making for convenience in shipping and storage, and economies of use since the user may cut shapes of a wide variety of sizes from a stock roll.

Thus highway and traffic authorities may utilize the ordinary enameled highway and traffic signs and markers which are already in use, and at small expense cut and affix thereto the present reflex reflector sheet material either as letters, numerals or other indicia, superposed over those of the sign, or such sheet material may be cut out and applied to form a reflecting border or background, the apertures in the sheet conforming to the letters, numerals, or other indicia of the sign. Or, as in the case of a sign having embossed, raised, indicia, the sheet may be applied entirely over the sign, conforming to the surface contours, and the raised portions blacked out by running a roller coated with ink or paint over the sign. Considering the large number of signs used in even a relatively small city, it is evident that cost considerations are important and that a reduction in cost of providing weatherproof reflex type signs will make possible the use of such signs on a large scale. The toll of traffic injuries and deaths is so enormous that any economically feasible means of reducing it is clearly of the greatest importance to the public, while saving of expense is obviously a direct benefit to the taxpayers.

Various other objects and features of the invention will be evident from the following description.

In the accompanying illustrative drawings:

Figs. 1, 2 and 3 are diagrams indicating, in magnified form, sections of reflex reflectors;

Figs. 4 and 5 are plan and sectional views, respectively, of a highway "stop sign" provided with a reflexive background formed of reflex reflector sheet material;

Fig. 6 is a diagram used in illustrating the nature of the reflex reflection obtained; and Figs. 7 and 8 are graphs showing the relation of brilliancy to the index of refraction of the spheres, for various angles of incident light, with respect to three different forms of reflex reflectors.

Referring to Fig. 1, an illustrative embodiment 9 is shown having a base or backing 10 coated on one face with a reflective pigmented binder layer 11 in which are partially embedded a multiplicity of contiguous small transparent spheres or beads 12 forming a reflexive (light-returning) layer. These spheres or beads may be made of glass or transparent synthetic resin and have an index of refraction in the range of approximately 1.70–1.90. Frosted or etched beads should not be used since the surface of such beads would cause diffusion of incident light. They are embedded so that somewhat less than half the surface is exposed, thus being held firmly in sockets provided by the bonding layer. Owing to capillarity, the bonding layer surface is curved between the beads, that is, rises higher upon the beads than the surface midway between adjacent beads. The exposed surfaces of the beads provide a multiplicity of contiguous convex lens elements, and reflection of incident light occurs at the inner or rear surfaces of the beads; the pigmented binder forming hemispherical concave reflection surfaces upon or against the surfaces of the beads. The combination of beads and reflectors constitutes an optical system which, by refraction and reflection, collimates and returns incident light back toward its source.

Various types of reflective binders may be used. A binder which is pigmented with a flaked metallic pigment such as aluminum flakes, produces a semi-specular type of reflection resulting in reflex reflection characteristics of the character shown by the I series of curves of Fig. 7, with the brilliancy being appreciably affected by the angle of the incident light. The metallic flakes provide a reflection which may be regarded as a combination of specular and diffuse reflection, being intermediate in nature, and hence the term "semi-specular" is used. The aluminum flakes give a silvery color to the reflected light. A binder which is pigmented with a highly diffusing pigment (such as titanium dioxide) produces an extreme non-specular type of reflection from its surface, resulting in reflex reflection characteristics of the character shown by the II curve of Fig. 7, with the brilliancy being substantially independent of the angle of incidence for angles up to at least 45°.

Fig. 2 shows a variant form of construction having a reflective base or backing 13 of aluminum foil coated on one face with a transparent binder layer 14 in which is partially embedded a layer of transparent spheres or beads 15 having an index of refraction in the range of approximately 1.70–1.90. The beads are shown in tangent contact with the reflective surface, but may be pressed into the foil so as to provide a substantial area of direct contact. In this case a substantially specular metallic reflector is employed, giving silver reflection; and the reflector surface is only in contact with the inner extremities of the beads, so that highly angular incident light will traverse a portion of the transparent binder before and after striking the reflector surface, in contradistinction to the reflector arrangement shown in Fig. 1. This type of construction results in the reflex reflection characteristics shown by the III curves of Fig. 8. However, spacing of the beads from the reflector surface may be employed to further increase the brilliancy when the index of refraction is such that the maximum possible brilliancy is not secured with direct bead-reflector contact. Tin foil may be used in place of aluminum foil, and of course sheets of other reflective metals may be employed.

The foregoing illustrative forms of construction do not exhaust the possibilities. For example, in the Fig. 1 type, the concave reflectors might be formed by silvering the beads, which are then embedded in a suitable binder, and the exposed surfaces cleared by removing the silvering therefrom, as a result of which specular metallic reflection is obtained at the inner surfaces of the spheres. In the Fig. 2 type, instead of using a reflective foil base, the transparent binder may be applied to a backing which has been provided with a pigmented reflective coating of either the diffuse or semi-specular kinds.

Fig. 3 shows an illustrative combination having a flexible sheet backing 16, which may be paper, having a reflector surfacing 17 on one face, which may be a pigmented coating or a metal foil. Upon the latter there is provided a pigmented bonding coat 18 in which a layer of transparent beads 19 is partially embedded, the inner extremities of the beads being in contact with the reflector surface of layer 17 so that reflection will occur from the latter as to incident light striking in the small contact area. Angularly incident light will be reflected from the pigmented binder 18 which contacts the side portions of the beads which are out of contact with the rear reflector surface. Where the layer 17 is composed of a pigmented sizing similar to the pigmented binder 18, this construction will have the same properties as that shown in Fig. 1, the advantage being that the beads can settle through the binder layer during manufacture without impairing reflection at the inner extremities, and that the sizing also may be used to seal the surface of the backing and its surface will be smooth and flat. Therefore the subsequent discussion of the optical properties of the Fig. 1 construction applies equally to such a Fig. 3 type of construction.

However a structure having a combination of desired properties can also be made. The reflector 17 may be an aluminum paint sizing or an aluminum foil, to give metallic "silver" reflection, with the beads being pressed against it to form a substantial contact area, while the binder layer 18 may be pigmented with titanium dioxide, for example; so that incident light striking the beads with a small angle of incidence (substantially paraxial rays) will undergo reflection from the metallic surface, while substantial angular rays will be reflected from the non-specular diffuse reflecting binder surface in contact with the sides of the beads. The result is that such a reflex reflector gives very brilliant reflex reflection for light striking substantially normal to its surface, but also possesses excellent angularity characteristics.

Fig. 4 shows a highway "stop" sign illustrating a use of the reflex reflector sheeting, and Fig. 5 shows a section of such a sign in magnified diagrammatic fashion. The base of this sign is a regular embossed and enameled stiff metal sign 20 and may be one which is already in use. This has black lettering raised above the background level by embossing as indicated by reference numeral 21.

A piece of the reflex reflector sheet 9 is cut to size to fit within the raised marginal border of the sign and has apertures cut therein corresponding to the raised lettering (or other indicia). It is then bonded to the sign, as by means of a cement layer 22. The raised lettering or other indicia project through the apertures and are as visible as before. The reflex reflector sheet forms a background surface and this reflex reflecting part of the sign will be visible at a great distance at night to drivers of approaching vehicles whose lights provide illumination. At first only the general glow will be seen, but this will warn that a sign is being approached; then the letters or indicia will be seen as dark areas against the bright background; and finally the enameled surfaces of the letters will be seen.

With a reflector sheet of sufficient thinness and flexibility, it may simply be placed over the sign base without cutting of apertures and be pressed to conform to the embossings. The raised portions of the reflector sheet may be "blacked out" by printing or coating the raised beaded areas with a black or colored ink or paint, to provide lettering or other indicia visible as in an ordinary sign, with a reflex reflecting surrounding background.

The reflex reflector sheeting may of course be cut into letters, numerals, arrows, or other indicia, and these may be adhesively united to any desired base. Reflector sheeting of contrasting color may be used as a background. Thus a white reflector sheet may be applied to the sign base, and indicia cut from colored type reflector sheeting may be bonded to the surface of the base reflector sheet. Various colors may be obtained by using tinted glass or by using colored pigments to provide the reflecting surface underlying the beads. Thus in Fig. 1, the reflector 11 may be a colored pigmented layer, or use may be made of a white pigment to provide white reflection.

Reference is now made to Fig. 6 which is a diagram used to illustrate certain optical factors involved in reflex reflectors as a class. A ray or pencil of rays is shown coming from a distant source and impinging upon the reflex reflector with an angle of incidence $i$ (the angle between an incident ray and the normal). If a mirror were used, producing specular reflection, the emergent or reflected rays would leave the reflector at the same angle but on the other side of the normal. If a diffusing surface were used, emergent or reflected rays would go off indiscriminately in all directions and only a small fraction would return toward the source. However, with reflex reflection, there is a collimation by the lens elements interposed over the reflector surface and a cone of brilliant light is returned toward the source, the axis of the cone being substantially the same as the axis of the incident ray or pencil of rays. By "cone of brilliant light," it is meant that the intensity of light within the cone is greater than would be the case where diffuse reflection occurs. This may hold true only where the angle of incidence $i$ does not exceed a certain value, depending upon the particular type of reflex reflector which is used.

If we consider only the brilliance of the returned light within a narrow cone (say one which includes light within an angle of about 10' of the incident ray or axis of incident pencil of rays) and compare its intensity for various angles of incidence, it will be found that the intensity generally varies as the angle of incidence increases. With some types of reflex reflectors a rapid drop in brilliancy occurs, while with others there may be very little drop until a large angle of incidence occurs. A reflex reflector is said to have "good angularity" when there is no great drop off of intensity for angles of incidence less than a substantial value. But the value of the reflex reflector also depends upon reflectivity or intrinsic reflecting efficiency, since good angularity may be more than offset by the fact that even the maximum brilliancy (when $i=0°$) may be poor, due to excessive diffusion of light.

There is a third factor of importance which results from the fact that the eye of the observer is seldom on the axis of incident light. Thus in the case of an automobile approaching a highway sign, there will be an angle between any given ray of incident light (approaching the sign from the headlights) and the reflected rays reaching the driver's eyes. Hence if the reflex reflector is perfect in directional action, with incident light being returned only to its source, it would have little or no utility in the sign field. There should be a coning out of reflexive light rays in order that persons near but off the axis of incident light may take advantage of the reflex characteristic of the reflector or sign, but this coning out should not be excessive or the reflectivity will suffer through diffusion of light outside the useful range. The coning out results from the deviation of emergent rays from the axis of incident light. The deviation of a particular ray is illustrated in Fig. 6, and the "deviation" as regards a ray reaching the observer's eye may be defined as the acute angle between the incident ray and the emergent ray, designated as angle $d$.

Referring now to the graphs of Figs. 7 and 8, the curves show the relation between reflexive brilliancy and the refractive index of the spheres or beads for the forms of construction shown in Figs. 1 and 2. Of particular importance, curves are presented for various angles of incidence (0°, 15°, 30° and 45°) in order to show our discoveries as to the relation of angularity characteristic to index of refraction for the various forms of construction. In each construction graded small glass beads were used, of the order of 5–10 mils diameter. The graphs cover the broad refractive index range of 1.52–2.0 in order to facilitate comparisons and bring out the special features found in the critical range of approximately 1.70–1.90.

The following table gives the composition of the glasses employed in the higher part of the range, the proportions being in percentage by weight:

|  | A | B | C | D | E |
|---|---|---|---|---|---|
| Refractive index | 1.82 | 1.86 | 1.90 | 1.94 | 2.0 |
| $SiO_2$ | 24.9 | 20.3 | 18.3 | 17.3 | 16.3 |
| PbO | 72.9 | 78.8 | 80.8 | 81.8 | 82.8 |
| $K_2O$ | 0.6 | 0.9 | 0.9 | 0.9 | 0.9 |
| $Na_2O$ | 1.6 | | | | |

Measurements were made with a photometer designed to measure the intensity of a cone of reflected light having the same axis as the incident light, the cone embracing light rays deviating no more than approximately 10' (0.17°) from the axis. Comparison was made with light received from a standard lamp, the distance of which was varied until light from both sources was observed to be of the same intensity, the intensity from the standard lamp varying inversely as the square of the distance. The reflexive brilliancies of the various reflex reflectors, for various angles of incidence, could then be plotted to scale, as shown.

The vertical (brilliancy) scale of the graphs is arbitrary and shows relative brilliancies. This scale is logarithmic or exponential, and hence equal increments of distance in any part of the vertical scale represent equal percentage increments of brilliancy, and the details of the lower portions of the curves are brought out better. If the curves had been plotted on a regular linear scale basis, the peaks would be much more pronounced and striking, and this should be borne in mind.

In Fig. 7 the group of curves marked I show the results for the Fig. 1 type of construction in which the beads are embedded in an aluminum paint type of binder such that semi-specular reflection occurs from the concave spherical surfaces in contact with the inner surfaces of the beads. It will be noted that optimum brilliancy is secured in the critical refractive index range of approximately 1.70–1.90, and that the peak for each of the various angles of incidence occurs in the range of 1.85–1.90. Further, that the peak value of brilliancy for 0° incidence is more than 50 times as great as when ordinary glass of 1.52 index is used and about 1.4 times as great as when glass of 2.0 index is used.

The angularity characteristic is of particular importance and interest. It will be seen that in the case of ordinary low index glass, the brilliancy for angles of incidence of 15–45° is but little more than one-half the magnitude of brilliancy for 0° incidence. The use of high-index spheres results in even better angularity characteristics, since for light incident at angles up to at least 30° there is closer agreement of brilliancy values than is the case when ordinary glass is used, up to an index value of at least 1.85. Hence the use of spheres having a refractive index within the range of approximately 1.70–1.90 results not only in a phenomenal increase of brilliancy but this increase is not secured at the expense of good angularity characteristics.

Curve II of Fig. 7 shows the results for a similar construction in which the binder is pigmented with titanium dioxide which provides a non-specular or diffuse type of reflection from the concave binder surfaces contacting the spheres. A single curve is given because the brilliancy values for all angles of incidence within the range of 0–45° are substantially identical for each refractive index value. The peak value of brilliancy occurs in the refractive index range of 1.85–1.90 and is about 8 times that for 1.52 index glass and about 1.5 times that for 2.0 index glass.

In Fig. 8 the III group of four curves shows the results for a Fig. 2 type of construction in which the beads are in contact with an aluminum foil reflector surface and are embedded in a transparent binder. The binder had a refractive index of 1.53 in all cases, and hence some refraction of substantially off-axis light occurred at the inner interface of bead and binder, particularly where high-index beads were used, although this circumstance is not of critical importance. It will be noted that peak brilliancy for 0° incident light occurs at a refractive index just below 1.90 and that its magnitude is substantially the same as in the Fig. 1 type of construction where an aluminum pigment binder is used (see the 0°—I curve of Fig. 6). With this construction, the brilliancy values for 30° and 45° incident light increase but do not reach a high magnitude with increase of refractive index. There is however a very marked increase for light incident at angles up to somewhat over 15°, which means that the angularity characteristic is good for many purposes. It will be noted that the brilliancy for 15° incident light is actually greater than that for 0° incident light up to a refractive index value of about 1.8, after which the brilliancy drops off for the 15° incident light but continues to increase for the 0° incident light up to its peak value at 1.9. It will further be noted that the 15° curve has a value at its peak which is about three times its value at an index of 2.0. Optimum results with this construction are seen to be obtained when the glass beads have a refractive index of about 1.85.

It will be seen that in all cases shown in Figs. 7 and 8, a phenomenal increase of brilliancy is obtained by using beads having a refractive index in the range of approximately 1.70–1.90, as compared with ordinary glass; that the optimum refractive index lies in this range; and that good angularity characteristics can be secured within this range, contrary to the usual expectation that a great improvement of brilliancy is obtained at the expense of good angularity. The data shows that the use of high-index glass within this range, notwithstanding its higher cost, can be justified because of the magnitude of improvement. It also shows that above this range there is a marked falling off in desirable properties and that the use of glass of higher index is not warranted.

So far as we are aware no disclosure has been made in the prior art which teaches our discoveries. Even if it were supposed that some improvement in brilliancy could be obtained by using beads of higher refractive index than that of ordinary glass, there would be no basis for supposing that there would be a phenomenal improvement in brilliancy coupled with good angularity characteristics, nor that a critical refractive index range of approximately 1.70–1.90 exists within which there is a particularly advantageous combination of high brilliancy and good angularity. There is a further reason why our discoveries are of great practical value. The existence of an intermediate critical range within which optimum results are secured, means that silica glasses can be employed to secure high-brilliancy reflex reflection in reflectors intended for outdoor use. Silica glasses, at least those of the lead type, are not weather-resistant when compounded so as to have a refractive index approaching the value of 2.0 or higher, and in general the cost of making glass having an index of 2.0 is much higher than is the case for glass of lower index.

In addition to high brilliancy and good angularity characteristics, the constructions employing high index beads in accordance with this invention possess good "divergency" characteristics. That is, while there is a high concentration of returned light about the axis of incident light, so as to produce high reflective brilliancy and visibility at great distances, there is sufficient coning out so that an observer in a distant approaching vehicle will see brilliant light (i. e., the deviation of rays reaching the observer's eyes will be within the cone of high brilliancy). When the vehicle is near the reflector the divergency of light reaching the observer's eyes will be outside the cone of high brilliancy, but there will be sufficient light to permit seeing, because of the greater intensity of the light striking the reflector. This point is emphasized, since a reflector might have great brilliancy when viewed on the axis of incident light and yet the brilliancy might drop off so rapidly away from the axis that the observed brilliancy, to an observer in an approaching car, would be relatively poor. Hence our discoveries embrace the fact that good divergency characteristics can be obtained using beads having a refractive index in the critical range. The driver or other occupant of an approaching car will see a roadside sign, made with our reflex reflector, at a great distance and will continue to see it until it is substantially reached.

The transparent spheres may be made from synthetic resins of suitable refractive index. We prefer to use inorganic glass because of its cheapness, hardness and durability. Lead glasses can be made which have refractive indices within the critical range and which also have a sufficient resistance to weathering. A further example of a type of glass which can be made to have a suitable high refractive index is given in the U. S. patent to Eberlin, No. 2,206,081, issued July 2, 1940. The preferred size for the spheres or beads is in the range of 4–10 mils average diameter, the beads being screen graded if necessary so as to avoid an undue variation in size and provide a relatively smooth surface in the reflector product. The beads may, however, be smaller or larger than this, but it is best not to go outside the range of about 3–50 mils (average) diameter.

*Example*

This example gives instructions for making illustrative embodiments of the invention.

The following illustrates a paper treatment used in making a flexible sheet backing. Two batches are compounded, to be united before paper treatment, having the following formulae, in parts by weight:

Rubber-resin solution:                        Parts
  Latex crepe_____ 100
  Rosin _____ 160
  Zinc oxide_____ 100
  Beta-naphthol (antioxidant) _____ 1
  Oleum spirits (volatile petroleum hydrocarbon solvent of 306–424° F. boiling range) _____ 200
Vulcanizer solution:
  "Tetrone—A" (dipentamethylene-thiuram-tetrasulfide) _____ 3
  Latex crepe_____ 3
  Oleum spirits_____ 24

The rubber-resin solution is prepared by milling the rubber and zinc oxide for 30 minutes, at about 150–160° F., and the resultant sheet is then taken off the rubber mill and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication, and the mass is mixed for about 8–10 hours, or until reduced to a semi-fluid consistency, thereby breaking down the rubber and making it more plastic, less elastic and more penetrative. The balance of the rosin is slowly added and mixing is continued for another hour. The beta-naphthol is added, and the steam turned off and cooling water introduced into the heating jacket of the mixer. The oleum spirits is then added with continued mixing for half an hour, or until the mixture is homogeneous. The resulting solution may then be drawn off and stored until used.

The vulcanizer solution is prepared by milling together the "Tetrone—A" and rubber and dissolving in the oleum spirits. This procedure facilitates admixture of the vulcanizer with the rubber-resin solution.

The vulcanizer solution is mixed in with the rubber-resin solution just prior to use of the latter for the paper treatment, as the composite starts to gel within a few hours, even at room temperature.

A 38 lb. per ream saturating type paper may be used, for example, such as a porous size-free long-fibred rope paper. The paper is saturated with the impregnating solution and passed through squeeze rolls to remove excess, avoiding a surface layer of impregnant and thereby facilitating mechanical anchorage of such further coatings as may be applied. The paper is then festooned on racks and put through a drying oven to remove the solvent and vulcanize the rubber. An oven treatment involving 12 hours at 170° F. gives good results. This paper treatment results in a waterproof, unified product having an excellent ageing life and the tensile strength of the paper is increased. Vulcanization is not sufficient to build up elasticity and the paper has a dead stretch. The use of this type of backing permits of making reflector sheets which can be conformed to sign embossings. This sheet material provides the backing 10 of Fig. 1 construction.

In making a reflex reflector of the Fig. 3 type, the backing may then be coated on one face to provide the reflector layer or surface 17, using 25–30 grains per 24 sq. in. of the following:

Cellosolve (ethyleneglycol monoethylether)__ 90
Butvar (polyvinyl butyral) _____ 10
Titinox (titanium dioxide pigment)_____ 20

The coated backing is dried for one hour at 175° F.

This reflector coating gives non-specular diffuse reflection. A semi-specular metallic reflecting coating may be secured by using the following procedure in lieu thereof. The rubber-resin treated paper backing sheet is first given a coating to seal the surface pores and provide a smooth base surface for the reflector layer proper. The sealing composition is composed of:

Butvar _____ 15
Cellosolve _____ 135
Aluminum flake lining or bronzing powder_ 7½

An application of about 10 grains per 24 sq. in. should suffice, and the coating may be dried at 175° F. for one-half to one hour.

The following varnish base may be used for the reflector layer coating which is to be applied thereover:

Tung oil_____ 90.0
Linseed oil_____ 30.0
Ester gum (low-acid type)_____ 12.5
W. W. gum rosin_____ 12.5
"Paranol No. 1—Hard" (Paramet Chemical Corp.) (a modified phenol-aldehyde resin having a melting point of 250–260° F. and an acid number of 12–16)_____ 37.5
Red lead _____ 1.1
Cobalt linoleate_____ 0.5
Powdered manganese oxide_____ 0.01
Petroleum spirits thinner_____ 190.0

These ingredients are combined and cooked to varnish consistency. To 150 parts of this varnish base there is stirred in 15 parts of finely divided aluminum flakes (such as XD No. 30 aluminum lining powder, sold by Reynolds Metal Co.). This coating composition should be made up fresh just before use.

Approximately 7.5–8.5 grains per 24 sq. in. is applied over the sealing coat, followed by drying for one-half hour at 140° F. and one hour at 175° F. The aluminum flakes lie approximately flat at the surface.

In making the reflex reflector sheeting, a backing which has been prepared with a reflector surface as hereinbefore described, is coated with a bead-bonding binder of appropriate thickness (which depends upon the size of the beads employed), after which the beads are applied to form a bead layer embedded therein, and the sheet is then heated to dry or cure the binder. The formulae for three forms of binder are shown in the following table, the proportions being in parts by weight:

|  | Transparent | Semi-specular | Non-specular |
| --- | --- | --- | --- |
| "Rezyl 53" | 200 | 200 | 200 |
| "Beetle 227–8" | 100 | 100 | 100 |
| Hydrosolvent No. 2 | 15 | 30 | 30 |
| Aluminum pigment |  | 125 |  |
| Titanium dioxide pigment |  |  | 250 |

The "Rezyl 53" is a liquid alkyd resin composition sold by American Cyanamid Co., composed of 65% of a two-component type alkyd resin and 35% of a plasticizer of the non-drying oil or non-drying fatty acid type. It is illustrative and may be replaced by a similar material. An illustrative alkyd resin is the well known kind made from phthalic anhydride and glycerine. Castor oil is illustrative of non-drying oils and ricinoleic acid is the acid which can be derived therefrom as for example by heating together the glycerine and castor oil before adding the phthalic anhydride.

The "Beetle 227–8" is a 50% solution of urea-formaldehyde resin in a solvent composed of 60 parts butyl alcohol and 40% xylol, and is also sold by American Cyanamid Co. It is a thermosetting resin and causes the coating to set up at moderate temperatures, even though the Rezyl does not fully set up (serving partly as a plasticizer).

As the foregoing classes of materials are well known in the synthetic resin art, further elaboration is believed unnecessary.

The Hydrosolvent No. 2 is a volatile petroleum solvent which is aromatic in character, being obtained from stocks which are rich in aromatic hydrocarbons. It can be substituted for by benzol or toluol or mixtures thereof. The proportion of solvent may be varied to modify the consistency as desired.

Application of the beads is followed by heating at 175° F. for 20–30 hours to dry and cure the binder.

When the non-specular binder (pigmented with titanium dioxide) is employed over the similar reflector surface (pigmented with titanium dioxide), the optical properties will be as shown by curve II of Fig. 7. When the semi-specular binder and reflector surfacing (pigmented with aluminum powder) are used in combination, the optical properties will be as shown by the I curves of Fig. 7. That is, both of these Fig. 3 constructions will have the same reflex reflection properties as the corresponding Fig. 1 constructions.

Using the aluminum pigment type reflector in combination with the white binder (pigmented with titanium dioxide), the composite type of reflector will be secured which has previously been described.

By using the transparent binder over the aluminum type reflector surface, a structure will be secured which is similar to that shown in Fig. 2, since the aluminum flake coating will give semi-specular metallic reflection, although the brilliancy will not be quite as great as when an aluminum foil is used. The transparent binder described above in this example, after curing, has a refractive index of 1.53.

Finally, by using the transparent type binder to coat an aluminum foil, a structure of the Fig. 2 type can be obtained.

If desired, the reflex reflector sheet may be coated on the back with an adhesive, which may be protected with a removable liner, so that it will be in ready-to-lay form which does not require the application of adhesive at the time of use. Such adhesive coating may be of the pressure-sensitive type (normally tacky) or may be a solvent and/or heat activated type.

The reflex reflector sheets described in this example are all flexible, so that they may be wound upon cores and unwound to flat form without damage. They are also weatherproof, and will stand at least a year of continuous outdoor exposure even under severe conditions, which may involve exposure to extremes of heat and cold, to high and low humidities, and to rain, hail, sleet, snow and ice, and alternating freezing and thawing weather.

The invention is not of course limited to the use of flexible backings. Thus signs and markers, etc., may be made up directly wherein a rigid or semi-rigid metal base is used, having a metallic reflective surface upon which the binder coat is directly applied, or precoated with a white or colored enamel upon which the binder is applied, and the beads and binder may if desired be applied in certain areas only.

The invention also has value in the road striping field. A reflective binder may be applied to a highway surface to form a center stripe, curve marking, symbol, lettering, or other indicia, with beads partially embedded therein (as indicated in Fig. 1) to provide reflex reflection. For this type of "sign" the angle of incidence, for the light projected from the head lights of the vehicle in which the observer is riding, will be quite substantial. Hence the good angularity characteristics secured by employing beads having a refractive index of approximately 1.70–1.90, coupled with the high brilliancy characteristics, makes the present invention of particular value for this use.

Having described various embodiments of our invention, but without intent to be limited thereto, what we claim is as follows:

1. A reflex light reflector of the type having a layer of small transparent spheres providing a multiplicity of contiguous convex lens elements and having associated reflector means adapted in combination therewith to provide reflex reflection, characterized by said spheres having a refractive index within the range of approximately 1.70–1.90 so as to produce high brilliancy.

2. A reflex light reflector of the class in which a light-returning layer of contiguous small transparent spheres is partially embedded in a bonding layer with light-reflecting means being located behind the spheres, characterized by said spheres having a refractive index within the range of approximately 1.70–1.90 so as to produce high brilliancy coupled with good angularity and divergency characteristics.

3. A reflex light reflector having a layer of small transparent spheres provided with concave reflector means in contact with the rear portions thereof, said spheres having a refractive index of approximately 1.70–1.90.

4. A reflex light reflector having a layer of small transparent spheres partially embedded in a reflecting binder, said spheres having a refractive index of approximately 1.70–1.90.

5. A reflex light reflector having a layer of small transparent spheres partially embedded in a reflecting binder containing a non-specular reflective pigment, said spheres having a refractive index of approximately 1.70–1.90.

6. A reflex light reflector having a layer of small transparent spheres partially embedded in a reflecting binder containing a metallic pigment giving semi-specular reflection, said spheres having a refractive index of approximately 1.70–1.90.

7. A reflex light reflector comprising a backing having a reflective surface, a light-returning layer of small transparent spheres in close proximity thereto, the combination producing reflex reflection, and a binder holding the spheres in operative position, said spheres having a refractive index of approximately 1.70–1.90.

8. A reflex light reflector comprising a flat metallic reflector, a light-returning layer of small transparent spheres in contact therewith, and a binder holding the spheres in position, said spheres having a refractive index of approximately 1.70–1.90.

9. In a sign adapted for outdoor highway use, a reflex light-reflecting area comprised of a light-returning layer of small transparent spheres and an underlying reflector, said spheres having a refractive index of approximately 1.70–1.90.

10. In a sign adapted for outdoor highway use, a reflex light-reflecting area comprised of a layer of small transparent spheres partially embedded in a reflecting binder and having a refractive index of approximately 1.70–1.90.

11. In a sign adapted for outdoor highway use, a reflex light-reflecting area comprised of a layer of small transparent spheres having a refractive index of approximately 1.70–1.90, an underlying flat reflector in contact therewith, and a binder holding the spheres in operative position.

12. A highway surface sign or indicia, such as "road striping," having a reflex light-reflecting area comprised of a layer of small transparent spheres partially embedded in a reflecting binder, characterized by the employment of spheres having a refractive index of approximately 1.70–1.90.

13. A reflex light reflector comprising a flat metallic reflector having a specular characteristic, a light-returning layer of small transparent spheres in close proximity thereto, the spheres having a refractive index of approximately 1.70–1.90, and a non-specular reflecting binder in contact with the sides of the beads, so that light striking the spheres with a small angle of incidence will undergo reflection from the underlying metallic reflector while substantial angular rays will be reflected from the non-specular binder surface in contact with the sides of the spheres.

MELVIN L. GEBHARD.
HARRY HELTZER.
JOHN EDMUND CLARKE.
EDWARD P. DAVIS.